United States Patent
Hashimoto

[11] Patent Number: 5,601,245
[45] Date of Patent: Feb. 11, 1997

[54] BRAKE SYSTEM FOR USE IN DOUBLE BEARING TYPE FISHING REEL

[75] Inventor: Hiroshi Hashimoto, Tokyo, Japan

[73] Assignee: Daiwa Seiko, Inc., Tokyo, Japan

[21] Appl. No.: 602,607

[22] Filed: Feb. 16, 1996

Related U.S. Application Data

[63] Continuation of Ser. No. 217,718, Mar. 25, 1994, abandoned.

[30] Foreign Application Priority Data

Mar. 26, 1993 [JP] Japan .................... 5-090417

[51] Int. Cl.$^6$ .................. A01K 89/015; A01K 89/033
[52] U.S. Cl. ................... 242/260; 242/270; 242/303
[58] Field of Search ................... 242/260, 269, 242/270, 271, 303; 254/330

[56] References Cited

U.S. PATENT DOCUMENTS

| | | | |
|---|---|---|---|
| 2,896,876 | 7/1959 | Bogar | 242/270 X |
| 3,432,114 | 3/1969 | Meisner | 242/271 X |
| 3,572,607 | 3/1971 | Wilson | 242/258 X |
| 3,642,231 | 2/1972 | Fleischer | 242/271 |
| 4,131,245 | 12/1978 | Noda | 242/270 |
| 4,422,600 | 12/1983 | Preston | 242/271 |

FOREIGN PATENT DOCUMENTS

| | | |
|---|---|---|
| 48-39558 | 11/1973 | Japan . |
| 63-43902 | 11/1988 | Japan . |
| 4-51585 | 12/1992 | Japan . |

*Primary Examiner*—Katherine Matecki
*Attorney, Agent, or Firm*—Longacre & White

[57] ABSTRACT

A brake system for use in a double bearing type fishing reel. A brake cylinder storing frictional brake plates therein is accommodated within a radial space between a spool and a spool support shaft which are relatively rotatable. An engagement portion and a cooperative engagement portion are provided on the brake cylinder and the spool, respectively, so as to selectively engage with each other by the translational motion of the spool relative to the spool support shaft. The disengagement between the engagement portions of the spool and brake cylinder by the action of an operation member establishes a spool free condition in which the frictional brake plates apply no adverse influence onto the free rotation of the spool.

10 Claims, 2 Drawing Sheets

BRAKE SYSTEM FOR USE IN DOUBLE BEARING TYPE FISHING REEL

This is a continuation of application Ser. No. 08/217,718 filed Mar. 25, 1994, which was abandoned upon the filing hereof.

BACKGROUND OF THE INVENTION a) Field of the Invention

The present invention relates to an improved brake system for use in a double bearing type fishing reel. The braking system of the invention provides a plurality of interposed brakes plates which frictionally couple a spool support shaft to the brake cylinder. An manually controlled operation member is provided to control the brake system of the invention.

b) Description of Related Art

A double bearing type fishing reel is commonly known to have an arrangement wherein a spool is rotatably supported on a spool support shaft which is in turn supported between two side plates of a reel main body. Japanese Patent Kokoku Publication No. Sho. 48-39558 discloses a brake system for the known double bearing type fishing reel, which is arranged such that a brake member is stored within a fishing line winding barrel portion of a spool in order to protect the braking member from sea water, dust and the like and to thereby maintain the braking ability.

The above-mentioned brake system, however, has a disadvantage in that even if a braking force applied to the spool is intended to be removed with the action of an operation member to switch the brake system into a spool free condition, frictional resistances between a plurality of brake plates cannot be completely removed, and thus, some braking force remains applied onto the spool. That is to say, the conventional braking system provided within the spool cannot establish a perfect spool free condition, which makes it difficult to smoothly and instantaneously feed out a fishing line as desired.

SUMMARY OF THE INVENTION

The present invention eliminates the drawbacks found in the conventional double bearing type reel with a brake system stored within a spool drum.

An objective of the present invention is to provide a double bearing type fishing reel with a brake system which can establish a completely spool free condition to permit desired free rotation of a spool and enable smooth feed out of the fishline from the spool.

In order to attain the above-noted and other objectives, the present invention provides a fishing reel having a pair of side plates, the fishing reel including: a spool shaft rotatably supported with respect to the side plates; a spool rotatably arranged on the spool shaft and relatively translatable with respect to the spool shaft, the spool defining a radially inner chamber between the spool and the spool shaft; braking means disposed within the chamber and having a first brake member nonrotatably coupled to the spool shaft, and a second braking member rotatably coupled to the spool shaft and adapted to frictionally engage with said first braking member; and interlocking means for selectively interlocking the second braking member with the spool to prevent a relative rotation therebetween.

According to the present invention, when one of the spool and the spool support shaft is slid or translated in the axial direction relative to the other to connect a portion of the spool with a cooperative portion of the brake cylinder (e.g. a part of the second braking member), then the rotational movement of the spool support shaft can be transmitted through the friction of the braking means to the spool as well as the counter-rotation of the spool can be braked by the frictional force of the brake means. The frictional braking force can also be adjusted depending on the magnitude of relative pressure contact or depression of the first and second braking members. Significantly, if one of the spool and spool support shaft are slid or translated in the axial direction relative to the other to disconnect the portion of the spool from the cooperative portion of the brake cylinder, the braking system of the present invention can establish a completely spool-free condition wherein the spool is completely separated from the brake cylinder and is permitted to rotate freely without any frictional resistance applied from the braking means.

A brake system for use in a double bearing type fishing reel according to an embodiment of the present invention will now be described with reference to the drawings attached hereto.

DETAILED DESCRIPTION OF THE PREFERRED EMBODIMENTS

Figure 3:
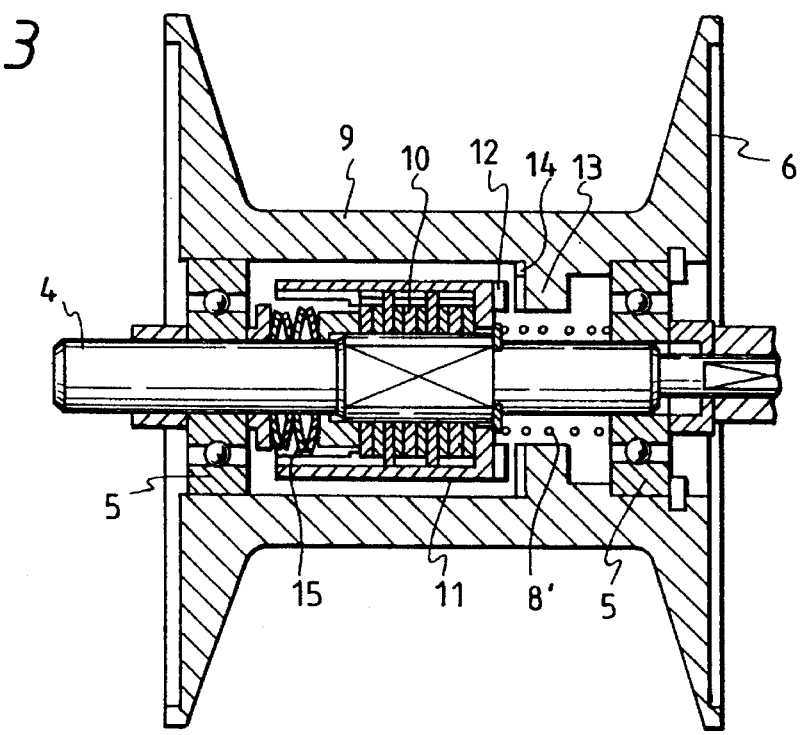
FIG. 3 is a longitudinally sectional front view showing a modification of the embodiment.

The double bearing type fishing reel includes a reel main body 1 having a pair of reel side plates 2 and 3. Between the two reel side plates 2 and 3, a spool support shaft 4 extends and is supported in such a manner that it can be rotated freely. A spool 6 is supported through bearings 5 by the spool support shaft 4 so that the spool 6 is freely rotatable and axially translatable with respect to the spool shaft 4. An operation member 7 is mounted on the end of spool support shaft 4 so as to be exposed outside the side plate 2 for manipulation by an angler. The operation member 7, in this embodiment, is arranged so as to drive the spool 6 toward and away from the reel side plate 3. More specifically, the rotational motion of the operation member 7 is converted into an axial motion along the spool support shaft 4 by means of a well-known cam mechanism 8, and the axial motion is, in turn, transmitted through a bearing 20, a pinion 18, the bearing 5 and low-friction plates 25 to the spool 6 so as to move the spool 6 toward the side plate 3 in the axial direction relative to the spool support shaft 4 against the biasing force of a spring 8'. In addition, the low-friction plates 25, which are rotatably fitted on the spool support shaft 4, may be omitted as shown in FIG. 3. In this case, the bearing 5 directly transmits the axial motion to the spool 6. The spring 8' is interposed between the spool 6 and a washer plate 27 rotatably fitted on a spool support shaft 4 so as to bias the spool 6 toward the side plate 2 relative to the spool support shaft 4.

Within a radially inner chamber defined by the spool 6, a brake cylinder 11 is rotatably fitted on a portion of the spool support shaft 4 which stores therein a plurality of frictional brake plates 10, i.e. first brake plates 10a and second brake plates 10b, in such a manner that the brake plates 10a and 10b are relatively pressure-contactable to each other. The first brake plates 10a are non-rotatably fitted on the spool support shaft 4, and the second brake plates 10b are rotatably fitted on the spool support shaft 4 and engaged with the brake cylinder 11, i.e. through a spline 11a. Thus, upon the depression by a plate spring 15, the first and second brake plates 10a and 10b frictionally couple the spool support shaft 4 and the brake cylinder 11.

An engaging portion 12 is provided at a portion of the brake cylinder 11 facing a cooperative engagement portion 14 provided in an annular part 13 of the spool 6. The engaging portion 12 and cooperative engagement portion 14 are located within the radially inner chamber of the spool 6, and engageable or connectable with each other in a clutch-like manner.

In the drawings, reference character 16 and 17 designate a handle shaft and a drive gear, respectively. The drive gear 17, which is fixed to the handle shaft 16, is prevented from rotating reversely by a well-known reverse rotation preventive device 19, so that the spool support shaft 4 is prevented from rotating reversely in the fishing line feed-out direction by means of the drive gear 17 and pinion 18.

In the reel provided with the above-mentioned braking system, when the spool 6 is depressed and translated toward the reel side plate 3 by the action of the operation member 7, the cooperative connecting portion 14 of the spool 6 is kept connected with the engaging portion 12 of the brake cylinder 11. Consequently, the rotational torque of the handle shaft 16 is transmitted to the spool 6 through the drive gear 17, pinion 18, spool support shaft 4, first and second brake members 10a and 10b, brake cylinder 11, engaging portion 12 and connecting portion 14, thereby allowing the spool 6 to rotate in conjunction with the handle rotation.

On the other hand, if the spool 6 is translated toward the side plate 2 by the action of the operation member 7 with the aid of the spring 8', then at the initial stage the braking force produced by the frictional brake plates 10a and 10b is gradually decreased because the depression by the spring 15 is gradually reduced. The braking force applied onto the spool 6 can be adjusted accordingly. In this initial stage, the connecting portion 14 and the engaging portion 12 remain engaged with each other.

Figure 1:
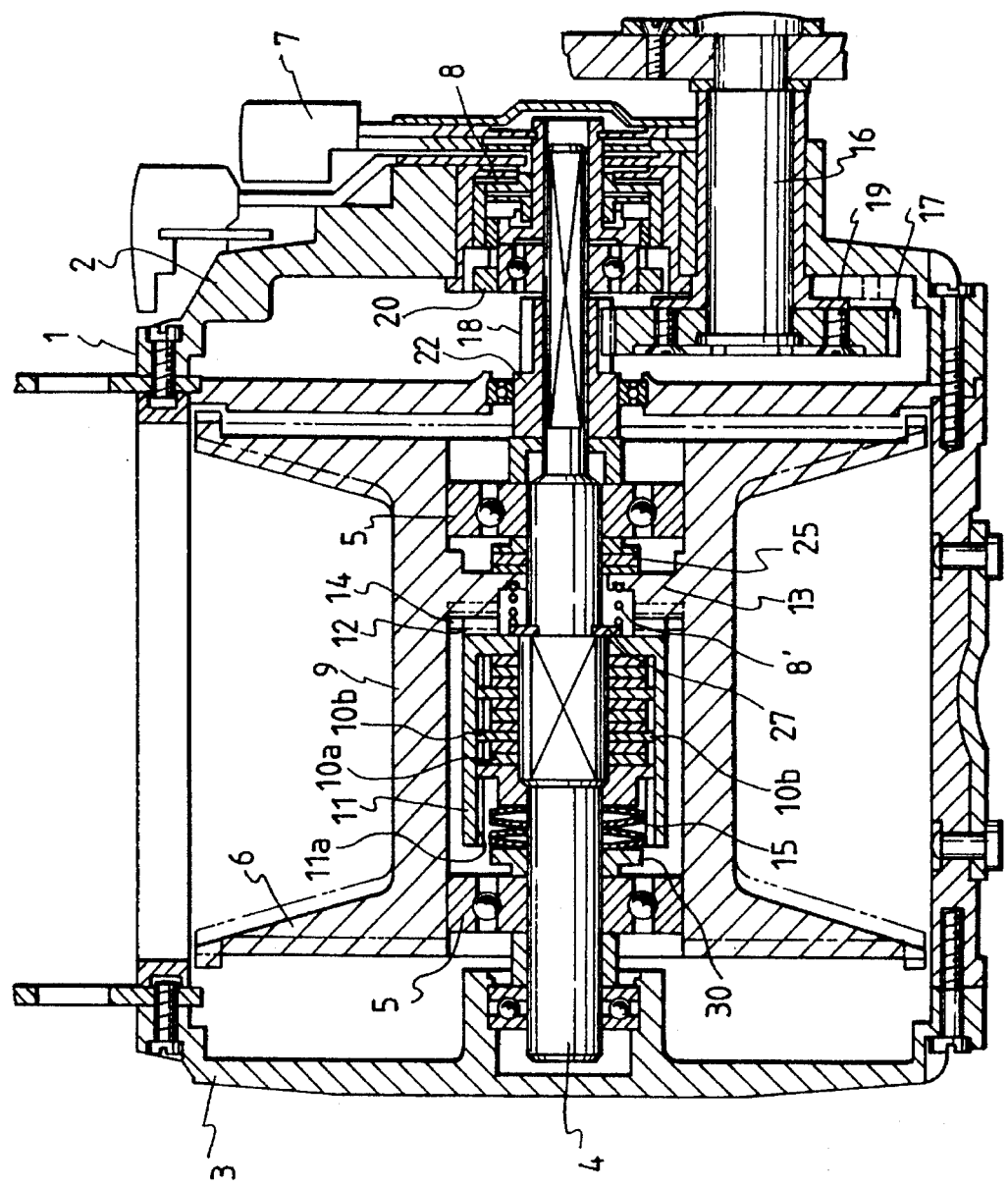
FIG. 1 is a longitudinally sectional front view of an embodiment of a brake system for use in a double bearing type fishing reel according to the present invention, showing a state in which a fishing line is to be wound.
Figure 2:
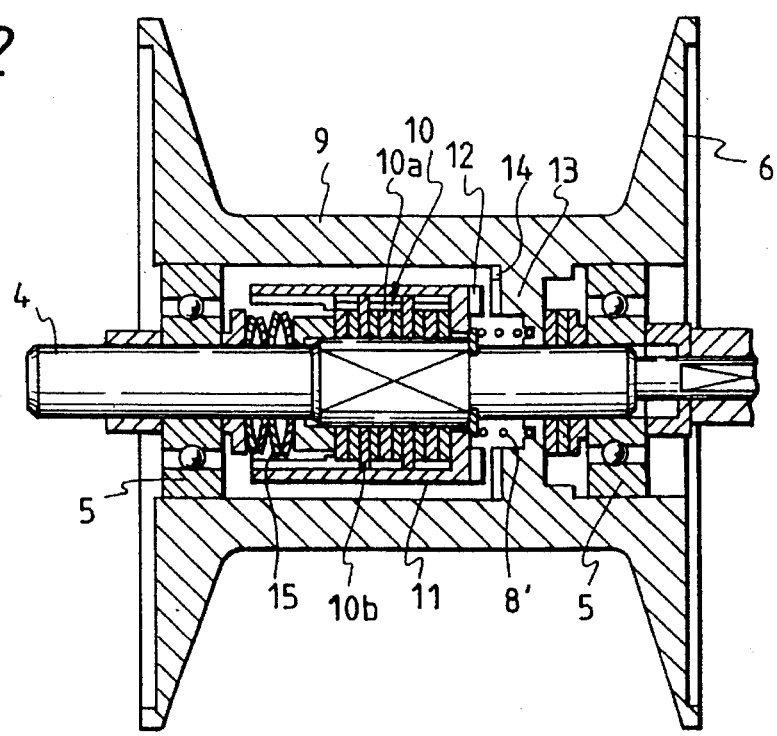
FIG. 2 is longitudinally sectional front view of the main portions of the embodiment, showing another state, i.e. spool free state in which the fishing line is to be fed out.

If the spool 6 is further moved toward the reel side plate 2 by means of the operation member 7, the connecting portion 14 of the spool 6 is disconnected from the engaging portion 12 of the brake cylinder 11 by the action of the spring 8'. Consequently, as shown in FIG. 2, the brake cylinder 11 and the spool 6 are positively separated from each other, and the spool 6 is held in a condition that it is free from the spool support shaft 4, which permits feeding-out of the fishing line smoothly and freely.

According to the embodiment, a brake system utilizes the movement of the spool in the axial direction thereof by means of the operation member so that the connecting portion of the spool is removably engaged with the engaging portion of the brake cylinder. However, the present invention is not limited thereto or thereby. For example, as disclosed in Japanese Utility Model Kokoku Publication No. Hei. 4-51585, a system for moving a spool support shaft in the axial direction thereof by means of an operation member can be utilized in order to removably engage the engaging portion of a brake cylinder with the connecting portion of the spool. In this case, the spool 6 may be retained stationally by a retaining member 30 which abuts a left-hand end of the plate spring 15 in the illustrated embodiment. The arrangement shown in FIG. 3 may also be applicable in this case.

According to the present invention, a plurality of frictional brake plates for braking the spool are stored in the brake cylinder and the engaging portion of the brake cylinder and the connecting portion of the spool are formed such that they are connectable with each other in a clutch manner. In a spool free state, the spool is held in a state perfectly free from the plurality of frictional brake plates so that the fishing line can be fed out smoothly and quickly. Thus, the present invention can facilitate the fishing-line feeding-out operation while retaining the advantage obtained by a double bearing type reel having the brake member disposed within the fishing line winding barrel portion of the spool.

While the foregoing invention has been particularly shown and described with reference to a preferred embodiment, it will be understood by those having ordinary skill in the art that various changes in form and detail may be made without departing from the spirit and scope of the invention.

What is claimed is:

1. A brake system for use in a fishing reel having a pair of side plates, the brake system comprising:

a spool shaft rotatably supported with respect to the side plates and extending in an axial direction;

a spool rotatably arranged on the spool shaft and relatively translatable with respect to the spool shaft, the spool defining a radially inner chamber between the spool and the spool shaft;

first and second bearing means for rotatably supporting said spool on said spool shaft, wherein said first bearing means is disposed at one end of said spool and the second bearing means is disposed at an opposite end of said spool, said inner chamber positioned between said bearing means;

braking means disposed within the chamber, and having a first brake member non-rotatably coupled to the spool shaft and a second braking member rotatably coupled to the spool shaft and frictionally engaging with the first braking member; and interlocking means for selectively interlocking the second braking member with the spool to prevent a relative rotation therebetween;

wherein the interlocking means includes a first engagement portion provided on the spool and a second engagement portion provided on the second braking member and located opposite to the first engagement portion for engaging with the first engagement portion by the translation of the spool with respect to the spool shaft, said interlocking means being disposed within said chamber.

2. The brake system according to claim 1, further comprising:

a biasing means for biasing the spool so as to disengage the first engagement portion from the second engagement portion.

3. The brake system according to claim 2, wherein a biasing force produced by the first biasing means is adjustable by the translation of the spool with respect to the spool shaft.

4. The brake system according to claim 1, further comprising:

a biasing means for biasing the first braking member against the second braking member.

5. The brake system according to claim 1, further comprising:

an operation member for driving the spool to translate with respect to the spool shaft, the operation member being mounted on a portion of the spool shaft protruded from one of the side plates.

6. The brake system according to claim 1, wherein the spool is translatable relative to the side plates.

7. The brake system according to claim 1, wherein the spool shaft is translatable relative to the side plates.

8. The brake system according to claim 1, further comprising first and second bearing means for rotatably supporting said spool on said spool shaft, wherein said first bearing means is disposed at one end of said spool and the second bearing means is disposed at an opposite end of said spool, and wherein said inner chamber is disposed between said first and second bearing means.

9. The brake system according to claim 1, wherein said interlocking means comprises:

a brake cylinder concentrically and rotatably mounted about said spool shaft within said inner chamber, said second braking member being non-rotatably and longitudinally translatably mounted to said locking cylinder, said second engagement portion being formed on one end of said locking cylinder.

10. A brake system for use in a fishing reel having a pair of side plates, the brake system comprising:

a spool shaft rotatably supported with respect to the side plates;

a spool rotatably arranged on the spool shaft and relatively translatable with respect to the spool shaft, the spool defining a radially inner chamber between the spool and the spool shaft;

first and second bearing means for rotatably supporting said spool on said spool shaft, wherein said first bearing means is disposed at one end of said spool and the second bearing means is disposed at an opposite end of said spool, said inner chamber being positioned between said bearing means;

braking means disposed within the chamber, and having a first brake member non-rotatably coupled to the spool shaft and a second braking member rotatably coupled to the spool shaft and frictionally engaging with the first braking member; and interlocking means for selectively interlocking the second braking member with the spool to prevent a relative rotation therebetween, said interlocking means being positioned between said first and second bearing means.

* * * * *